US008589050B2

(12) United States Patent
Kato

(10) Patent No.: US 8,589,050 B2
(45) Date of Patent: Nov. 19, 2013

(54) VEHICLE MOTION CONTROL DEVICE

(75) Inventor: Toshihisa Kato, Handa (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 489 days.

(21) Appl. No.: 12/822,400

(22) Filed: Jun. 24, 2010

(65) Prior Publication Data

US 2010/0332099 A1 Dec. 30, 2010

(30) Foreign Application Priority Data

Jun. 30, 2009 (JP) ................. 2009-155804

(51) Int. Cl.
*B60T 7/12* (2006.01)
(52) U.S. Cl.
USPC ........................................... 701/90
(58) Field of Classification Search
USPC ............... 701/82, 83, 90, 91; 303/9.67, 146
See application file for complete search history.

(56) References Cited

U.S. PATENT DOCUMENTS

| | | | | |
|---|---|---|---|---|
| 3,922,020 A | * | 11/1975 | Koike et al. | 303/9.67 |
| 5,390,991 A | * | 2/1995 | Tozu et al. | 303/165 |
| 5,799,261 A | * | 8/1998 | Ozaki et al. | 701/78 |
| 5,863,105 A | * | 1/1999 | Sano | 303/146 |
| 6,332,104 B1 | | 12/2001 | Brown et al. | |
| 6,377,885 B2 | * | 4/2002 | Yasui et al. | 701/80 |
| 6,755,486 B2 | * | 6/2004 | Nishio et al. | 303/114.3 |
| 7,337,047 B2 | | 2/2008 | Ueno et al. | |
| 2002/0145333 A1 | | 10/2002 | Faye | |
| 2004/0128060 A1 | | 7/2004 | Park | |

FOREIGN PATENT DOCUMENTS

| | | |
|---|---|---|
| DE | 10065590 A1 | 7/2002 |
| DE | 10344835 A1 | 7/2004 |
| DE | 60010421 T2 | 5/2005 |
| JP | 4084248 B2 | 2/2008 |

OTHER PUBLICATIONS

German Office Action dated Feb. 1, 2013 issued in the corresponding German Patent Application No. 10 2010 025 361.8 and English language translation.
Japanese Office Action dated May 14, 2013 issued in the corresponding Japanese Patent Application No. 2009-155804 and English language translation.

* cited by examiner

*Primary Examiner* — Tuan C. To
*Assistant Examiner* — Aaron L Troost
(74) *Attorney, Agent, or Firm* — Buchanan Ingersoll & Rooney PC

(57) ABSTRACT

A vehicle motion control device obtains an actual slip ratio and a physical quantity representing a state of motion of the vehicle in a direction of lateral overturn. The device is in an anti-lateral overturn mode when the physical quantity is larger than or equal to a motion state threshold. The device obtains an increase gradient and determines whether or not the increase gradient is larger than or equal to a predetermined increase gradient threshold, wherein the increase gradient is a ratio of an increase amount of the physical quantity to a decrease amount of the actual slip ratio. The device decreases, when the device is in the anti-lateral overturn mode and the increase gradient is larger than or equal to the increase gradient threshold, a speed of depressurization of a wheel cylinder pressure.

6 Claims, 11 Drawing Sheets

RELATED ART

RELATED ART

VEHICLE MOTION CONTROL DEVICE

CROSS REFERENCE TO RELATED APPLICATION

This application is based on and incorporates herein by reference Japanese patent applications No. 2009-155804 filed on Jun. 30, 2009.

FIELD OF THE INVENTION

The present invention relates to a vehicle motion control device for controlling pressures (hereinafter referred to as W/C pressures) to be generated at a wheel cylinder (hereinafter referred to as W/C) of a vehicle and accordingly suppressing lateral overturn of the vehicle.

BACKGROUND OF THE INVENTION

In Japanese Patent No. 4084248, brake control for a vehicle is described which sets a target slip ratio of a front outside wheel to a value higher than a normal value and controls the brake force at the front outside wheel based on the target slip ratio when a vehicle is under an avoidance maneuver operation in emergency, wherein the target slip ratio is higher than that in a spin control which works when a friction coefficient of a surface of a road (hereinafter referred to as μ) is high. More specifically, a correction coefficient is set to a higher value in order to correct the target slip ratio to a higher value when an inertia moment corresponding to an acceleration in the lateral direction of the vehicle (hereinafter referred to as a lateral acceleration) becomes larger. When the vehicle brake control under an avoidance maneuver operation starts, in order to suppress change in the W/C pressure and thereby prevent the vehicle from rolling and vibrating, duty cycles of boosting and depressurizing of the W/C pressure are set by using a map in which an increase rate and a decrease rate of the W/C pressures are suppressed compared to normal.

FIG. 12 is a graph showing a relation between the slip ratio and the lateral acceleration of the front outside wheel. FIG. 13 is a graph showing a relation between the lateral acceleration and a roll angle of the vehicle.

As shown in FIG. 12, the lateral acceleration reaches its peak value when the slip ratio becomes a certain value (approximately 5% in FIG. 12) and decreases as the slip ratio becomes larger beyond the certain value. As shown in a line 31 in FIG. 13, the lateral acceleration is proportional to the roll angle until the vehicle comes into a state where there is a possibility of the lateral overturn. Therefore, the lateral acceleration can be a parameter indicating the roll angle, which means that the roll angle becomes large as the lateral acceleration reaches its peak value. A region 32 is a region in which the lateral overturn is highly possible.

If the target slip ratio for the front outside wheel is set to a high value as in Japanese Patent No. 4084248, the target slip ratio becomes larger than a value of the target slip ratio at which the lateral acceleration reaches at its peak value. Therefore, the lateral acceleration can be suppressed if the actual slip ratio is controlled so that it becomes equal to the target slip ratio. FIG. 9 also shows an example of an anti-lateral overturn control in which the lateral acceleration decreases from a region 33 to 34 and a wheel such as front outside wheel accordingly slips. In addition, since increase or decrease of the W/C pressure changes the slip ratio and the lateral acceleration, restriction on the increase or decrease of the W/C pressure can decrease the change in the lateral acceleration and prevent vibration in rolling motion of the vehicle.

However, since the W/C pressure is always restricted during the avoidance maneuver operation in emergency in Japanese Patent No. 4084248, steerability of the vehicle deteriorates.

SUMMARY OF THE INVENTION

It is therefore an object of the present invention to provide a vehicle motion control device which can suppress lateral overturn of a vehicle while suppressing deterioration of the steerability of the vehicle.

According to an aspect of the present invention, a vehicle motion control device includes: a motion state obtaining means for obtaining, once per a predetermined calculation period, a physical quantity and an actual slip ratio being actually generated at a wheel of a vehicle, the physical quantity representing a state of motion of the vehicle in a direction of lateral overturn; a mode setting means for being in an anti-lateral overturn mode when the physical quantity obtained by the motion state obtaining means is larger than or equal to a motion state threshold, the anti-lateral overturn mode being for suppressing the lateral overturn of the vehicle; an increase gradient obtaining means for obtaining an increase gradient which is a ratio of an increase amount of the physical quantity to a decrease amount of the actual slip ratio; an increase gradient determination means for determining whether or not the increase gradient obtained by the increase gradient obtaining means is larger than or equal to a predetermined increase gradient threshold; and a depressurization speed suppression means for decreasing, when the vehicle motion control device is in the anti-lateral overturn mode and the increase gradient determination means determines that the increase gradient is larger than or equal to the increase gradient threshold, a speed of depressurization of a wheel cylinder pressure at a wheel cylinder for generating a brake force at the wheel, compared to when it is neither determined that the increase gradient is larger than nor equal to the increase gradient threshold.

The lateral overturn of the vehicle is supposed to occur when the actual slip ratio increases beyond a peaking slip ratio and subsequently decreases to a vicinity of the peaking slip ratio, wherein the peaking slip ratio is a slip ratio at which the physical quantity representing the state of the motion of the vehicle in the direction of the lateral overturn reaches its peak value and subsequently decreases to a vicinity of the peaking slip ratio. The ratio (increase gradient) of the increase amount of the physical quantity to the decrease amount of the slip ratio is large at the vicinity of the peaking slip ratio (see FIG. 12). Therefore, the lateral overturn of the vehicle can be suppressed while suppressing deterioration of the steerability of the vehicle if the speed of the depressurization of the W/C pressure is suppressed in a depressurization mode when the increase gradient of the physical quantity is larger or equal to a predetermined value, in other words, if the speed of the depressurization of the W/C pressure is not suppressed in a depressurization mode when the increase gradient of the physical quantity is neither larger nor equal to the predetermined value.

Here, the word "obtain" which is used in connection with the increase gradient obtaining means not only obtaining the increase gradient itself but obtaining determination as to whether the increase gradient is large or small.

The depressurization speed suppression means may change a way of decreasing the speed of the depressurization based on a total weight of the vehicle so that the speed of the depressurization becomes smaller as the total weight of the vehicle increases.

In the above-mentioned relation (see FIG. 12) between the slip ratio and the physical quantity, the peak value of the physical quantity and the increase gradient at the vicinity of the peaking slip ratio become larger as the total weight of the vehicle becomes larger. Therefore, the ratio of the increase amount of the physical quantity to the decrease amount of the actual slip ratio becomes larger as the total weight of the vehicle becomes larger. Therefore, by suppressing the speed of the depressurization of the W/C pressure so that the speed of the depressurization becomes smaller as the total weight of the vehicle becomes larger, the lateral overturn of the vehicle can be suppressed in more suitable way while suppressing deterioration of the steerability of the vehicle.

The increase gradient obtaining means may: set a range of the actual slip ratio within which the increase gradient is larger than a predetermined increase gradient threshold; determine that the increase gradient is larger than or equal to the increase gradient threshold when the actual slip ratio obtained by the motion state obtaining means is within the range; and determine that the increase gradient is neither larger than nor equal to the increase gradient threshold when the actual slip ratio obtained by the motion state obtaining means is not within the range. In this case, the increase gradient determination means may determine whether or not the increase gradient is larger than or equal to the increase gradient based on the result of determination of the increase gradient obtaining means.

The increase gradient obtaining means may: include a reference slip ratio setting means for obtaining a largest value of the absolute value of the physical quantity obtained during a time range between a present calculation period and a time instance when the vehicle motion control device enters the anti-lateral overturn mode, and also for setting a reference slip ratio to the actual slip ratio obtained when the largest value of the absolute value of the physical quantity is obtained; determine that the increase gradient is larger than or equal to the increase gradient threshold when the actual slip ratio obtained at the present calculation period by the motion state obtaining means is within a range between the reference slip ratio and a sum of the reference slip ratio and a predetermined constant value; and determine that the increase gradient is neither larger than nor equal to the increase gradient threshold when the actual slip ratio obtained at the present calculation period by the motion state obtaining means is not within the range between the reference slip ratio and the sum of the reference slip ratio and a predetermined constant value. In this case, the increase gradient determination means may determine whether or not the increase gradient is larger than or equal to the increase gradient based on the result of determination of the increase gradient obtaining means.

The actual slip ratio at which the increase gradient of the physical quantity becomes larger than or equal to a predetermined value changes depending on characteristics of a tire of the vehicle, a steering angle of the vehicle, and a state of a surface of a road beneath the tire. Therefore, by setting a range at which depressurization control is performed based on the peak value of the physical quantity which is actually detected, the lateral overturn of the vehicle can be suppressed under any state of the surface of the road while suppressing deterioration of the steerability of the vehicle.

In this case, the depressurization speed suppression means may change the way of decreasing the speed of the depressurization so that the speed of the depressurization becomes smaller as the difference between the actual slip ratio obtained at the present calculation period by the motion state obtaining means and the reference slip ratio set by the reference slip ratio setting means is smaller.

The increase gradient becomes larger as the actual slip ratio comes closer to the peaking slip ratio. Therefore, as the actual slip angle comes closer to the peaking slip ratio or the reference slip ratio which is close to the peaking slip ratio, the speed of the depressurization is suppressed so that it becomes harder to cause a roll angle of the vehicle to increase. Therefore, it is possible to enhance the effect of the anti-lateral overturn control especially in the case that the lateral overturn of the vehicle is more likely.

The increase gradient obtaining means may directly obtain the increase gradient which is the ratio of the increase amount of the physical quantity to the decrease amount of the actual slip ratio. In this case, the vehicle motion control device can obtain the increase gradient accurately and therefore determine accurately whether or not the increase gradient is larger than or equal to the increase gradient threshold.

Further in this case, the depressurization speed suppression means may change the way of decreasing the speed of the depressurization so that the speed of the depressurization becomes smaller as the increase gradient directly obtained by the increase gradient obtaining means increases. With this operation, as the physical quantity comes closer to its peak value, the speed of depressurization is suppressed so that it becomes less likely that the roll angle increases. Therefore, it is possible to enhance the effect of the anti-lateral overturn control when the lateral overturn is more likely.

The vehicle motion control device may further include a boosting speed enhancement means for increasing, when the vehicle motion control device is in the anti-lateral overturn mode and the increase gradient determination means determines that the increase gradient is larger than or equal to the increase gradient threshold, a speed of pressure boosting of the wheel cylinder pressure at the wheel cylinder for generating the brake force at the wheel, compared to when it is neither determined that the increase gradient is larger than nor equal to the increase gradient threshold.

Thus, the vehicle motion control device increases the speed of pressure boosting of the W/C pressure in a pressure boosting mode when the increase gradient of the increase amount of the physical quantity to the decrease amount of the actual slip ratio. With this operation, the vehicle motion control device can decrease the physical quantity representing the state of motion of the vehicle in the direction of the lateral overturn by increasing the actual slip ratio earlier so that the actual slip ratio gets apart from the peaking slip ratio earlier. Thus, it is possible to make an occasion more unlikely in which decrease of the actual slip ratio causes the physical quantity to come closer to its peak value. Therefore, it is possible to make an occasion unlikely in which the roll angle reaches a roll limit value at which the lateral overturn of the vehicle possibly occurs. Thus, it is possible to decrease possibility that the roll angle reaches the roll limit value and enhance the effect of anti-lateral overturn control.

BRIEF DESCRIPTION OF THE DRAWINGS

The invention, together with additional objective, features and advantages thereof, will be best understood from the following description, the appended claims and the accompanying drawings. In the drawings:

DETAILED DESCRIPTION OF THE EMBODIMENTS

Figure 1:
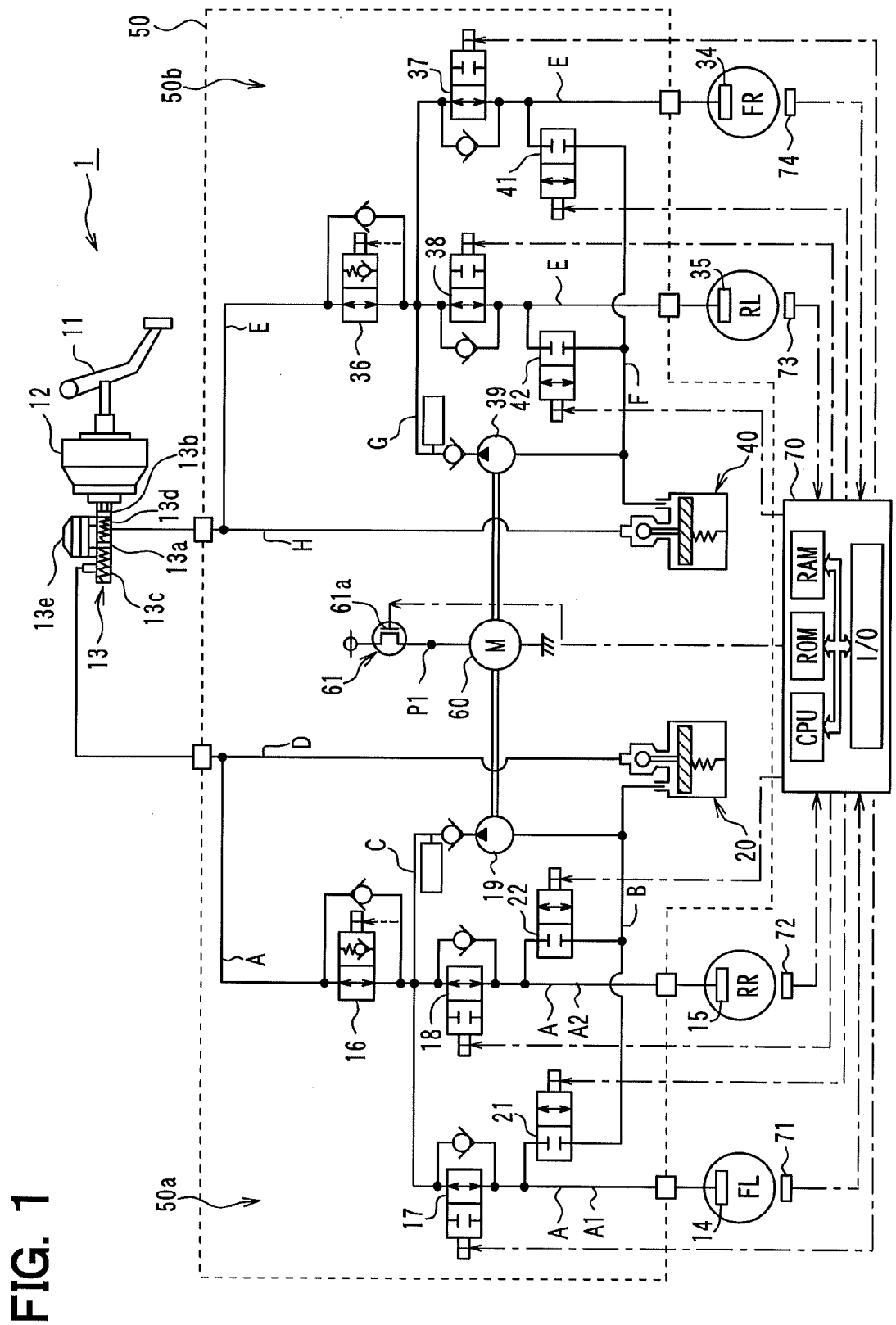
FIG. 1 is a diagram showing an overall structure of a brake control system for a vehicle which performs a vehicle motion control in a first embodiment of the present invention.

Hereinafter, preferred embodiments of the present invention will be described in detail with reference to the appended drawings. Note that elements that are the same or equivalent to each other in the following embodiments are denoted with the same reference numerals in the appended drawings.

First Embodiment

A first embodiment of the present invention will now be described. FIG. 1 is a diagram showing the overall structure of a brake control system 1 for a vehicle that realizes a vehicle motion control according to a first embodiment of the present invention. In the first embodiment, a case will be described in which an anti-lateral overturn control is performed as the vehicle motion control.

With reference to FIG. 1, when a driver depresses a brake pedal 11, the depression force is boosted by a servo unit 12, and pushes master pistons 13a, 13b located in a master cylinder 13. As a result, a same master cylinder pressure is generated in a primary chamber 13c and a secondary chamber 13d defined by the master pistons 13a, 13b. The master cylinder pressure is transmitted to respective wheel cylinders 14, 15, 34, and 35 through an actuator 50 for controlling brake fluid pressure.

The master cylinder 13 is provided with a master reservoir 13e having a passage that is in communication with the primary chamber 13c and the secondary chamber 13d.

The actuator 50 includes a first conduit system 50a and a second conduit system 50b. The first conduit system 50a controls brake fluid pressures applied to a left front wheel FL and a right rear wheel RR, and the second conduit system 50b controls brake fluid pressures applied to a right front wheel FR and a left rear wheel RL.

The first conduit system 50a and the second conduit system 50b have a similar structure. Accordingly, in the following description, only the first conduit system 50a will be explained and explanation of the second conduit system 50b will be omitted.

The first conduit system 50a includes a conduit A serving as a main conduit. The conduit A transmits the aforementioned master cylinder pressure to the wheel cylinder 14 provided at the left front wheel FL and the wheel cylinder 15 provided at the right rear wheel RR and thereby generates wheel cylinder pressures.

The conduit A includes a first differential pressure control valve 16 that can be controlled to a communicated state and a differential pressure state. The valve position of the first differential pressure control valve 16 is adjusted such that the first differential pressure control valve 16 is in the communicated state during a normal braking operation. In the normal braking operation, the driver depresses the brake pedal 11 and the vehicle motion control is not being performed. When an electric current is applied to a solenoid coil provided in the first differential pressure control valve 16, the valve position is adjusted such that the pressure difference becomes larger as the value of the electric current is increased.

When the first differential pressure control valve 16 is in the differential pressure state, the brake fluid is allowed to flow from the wheel cylinders 14, 15 side to the master cylinder 13 side only when the brake fluid pressure on the wheel cylinders 14, 15 side is higher than the master cylinder pressure by a determined pressure or more. Therefore, the brake fluid pressure on the wheel cylinders 14, 15 side is normally maintained not to become higher than the pressure on the master cylinder 13 side by the determined pressure or more.

The conduit A branches into two conduits A1 and A2 at the wheel cylinders 14, 15 side of the first differential pressure control valve 16 (i.e. downstream of the first differential pressure control valve 16). A first boost control valve 17 is provided in the conduit A1, and controls the increase in the brake fluid pressure to the wheel cylinder 14. A second boost control valve 18 is provided in the conduit A2, and controls the increase in the brake fluid pressure to the wheel cylinder 15.

The first and the second boost control valves 17, 18 are formed by a two-position electromagnetic valve that can be controlled to a communicated state and a closed state.

The first and the second boost control valves 17, 18 are normally open valves. More specifically, when a control current applied to solenoid coils provided in the first and the second boost control valves 17, 18 is zero (i.e. when no current is applied), the first and the second boost control valves 17, 18 are controlled to the communicated state. In addition, when the control current is applied to the solenoid valves, the first and the second boost control valves 17, 18 are controlled to the closed state.

A conduit B serving as a pressure reducing conduit connects a place in the conduit A between the first boost control valve 17 and the wheel cylinder 14 with a pressure adjusting reservoir 20, and connects a place of the conduit A between the second boost control valves 18 and the wheel cylinder 15 with the pressure adjusting reservoir 20. The conduit B is provided with a first pressure reducing control valve 21 and a second pressure reducing control valve 22 each formed by a two-position electromagnetic valve that can be controlled to a communicated state and a closed state. The first and the second pressure reducing control valves 21, 22 are normally closed valves.

Further, a conduit C serving as a reflux conduit is provided between the pressure adjusting reservoir 20 and the conduit A serving as the main conduit. The conduit C is provided with a self-priming pump 19 that is driven by a motor 60. The self-priming pump 19 sucks up brake fluid from the pressure adjusting reservoir 20 and discharges it to the master cylinder 13 side or the wheel cylinders 14, 15 side. Supply voltage to the motor 60 is controlled according to ON and OFF of a semiconductor switch 61*a* included in a motor relay 61.

Furthermore, a conduit D serving as an auxiliary conduit is provided between the pressure adjusting reservoir 20 and the master cylinder 13. The brake fluid is sucked from the master cylinder 13 through the conduit D by the pump 19 and is discharged to the conduit A. As a result, the brake fluid is supplied to the wheel cylinders 14, 15 side during a vehicle motion control such as an anti-lateral overturn control, a traction control (TCS) or the like, thereby increasing the wheel cylinder pressure of a target wheel.

Figure 2:
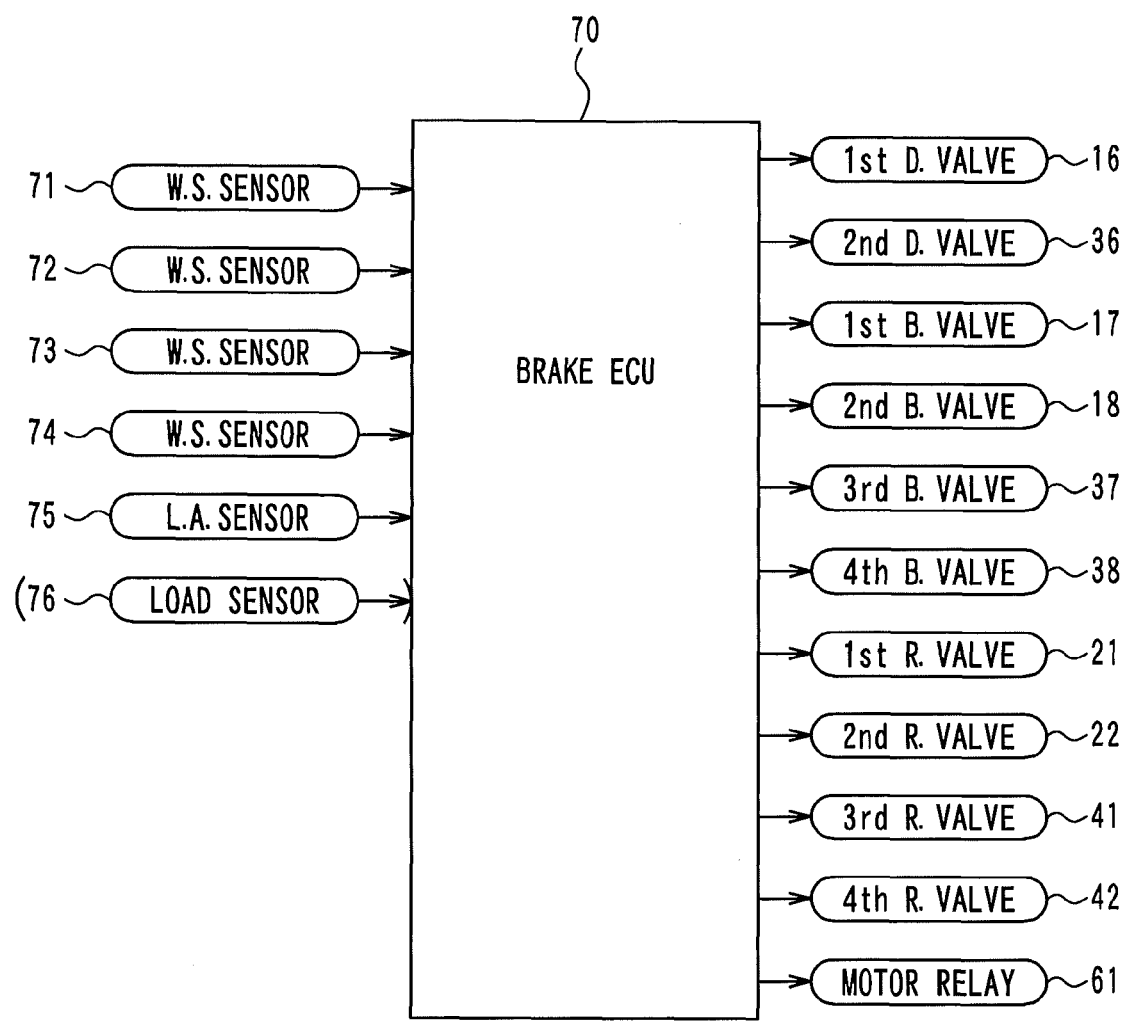
FIG. 2 is a block diagram showing input and output structure of a brake ECU.

A brake ECU 70, which corresponds to a vehicle motion control device of the present invention, controls a control section of the brake control system 1. The brake ECU 70 is a known microcomputer provided with a central processing unit (CPU), a read only memory (ROM), a random access memory (RAM), an input/output (I/O) port, and the like. The brake ECU 70 performs processing, such as various types of calculation, according to programs stored in the ROM and the like. FIG. 2 is a block diagram showing the relationship between the input and the output of a signal of the brake ECU 70.

As shown in FIG. 2, the brake ECU 70 receives detection signals from wheel speed sensors 71 to 74 provided at respective wheels FL to RR and a lateral acceleration sensor 75, and performs calculations of various types of physical quantities. For example, the brake ECU 70 calculates, based on the detection signals, the wheel speeds of the wheels FL to RR, a speed of the vehicle (i.e. an estimated speed of the body of the vehicle), slip ratios of the wheels, and a lateral acceleration. Based on the calculated physical quantities, the brake ECU 70 determines whether to execute the anti-lateral overturn control, selects a control target wheel to be under control of the anti-lateral overturn control, and calculates a control amount, that is, a W/C (wheel cylinder) pressure to be generated at the wheel cylinder corresponding to the control target wheel. Based on the above operation, the brake ECU 70 executes control for supplying electric currents to the control valves 16 to 18, 21, 22, 36 to 38, 41 and 42 and also controls amounts of the electric currents supplied to motor 60 for driving the pumps 19 and 39.

For example, in the case that the brake ECU 70 selects the left front wheel FL as the control target wheel and generates the W/C pressure at the wheel, the brake ECU 70 controls the first differential pressure control valve 16 to the differential pressure state, turns the motor relay 61 to ON, and drives the pump 19 by means of the motor 60. Then, the brake fluid pressure downstream (i.e. W/Cs 14, 15 side) of the first differential pressure control valve 16 increases because of the differential pressure generated at the first differential pressure control valve 16. At this time, the second boost control valve 18 corresponding to the right rear wheel RR as a non-control target wheel is closed so that the wheel cylinder 15 is not pressurized. In this state, in order to generate a desired W/C pressure at the W/C 14, the brake ECU 70 controls the first boost control valve 17 and a first pressure reducing control valve 21 which correspond to the left front wheel FL serving as the control target wheel.

More specifically, the brake ECU 70 properly switches between a depressurization mode, a pressure maintain mode and a pressure boosting mode to adjust the W/C pressures. In the depressurization mode, the first boost control valve 17 is controlled to the closed state and the first pressure reducing control valve 21 is switched between the communicated state and the closed state in a manner of duty control so that the W/C pressure is decreased. In the pressure maintain mode, the first boost control valve 17 and the first pressure reducing control valve 21 are controlled to the closed state so that the W/C pressure is maintained. In the pressure boosting mode, the first pressure reducing control valve 21 is controlled to the closed state and the first boost control valve 17 is switched between the communicated state and the closed state in a manner of duty control so that the W/C pressure is increased. Thus, an actual slip ratio Sa is controlled so that a desired target slip ratio Strg is achieved, wherein the actual slip ratio Sa is a slip ratio actually generated at a wheel.

It should be noted that the motor 60 drives the pump 39 as well as the pump 19. However, if the second differential pressure control valve 36 is not controlled to the differential pressure state, brake fluid is only circulated and the W/Cs 34, 35 are not pressurized.

The brake control system 1 of the present embodiment is constructed as above. Next, the specific operation of the brake control system 1 will be described. Note that the brake control system 1 can perform an anti-side slip (ABS) control and the like as a vehicle motion control, in addition to a normal brake control. The basic operations of these controls are the same as those of the related arts, so only the operation relating to the anti-lateral overturn control, which relates to a key feature of the present invention, will be described.

Figure 3:
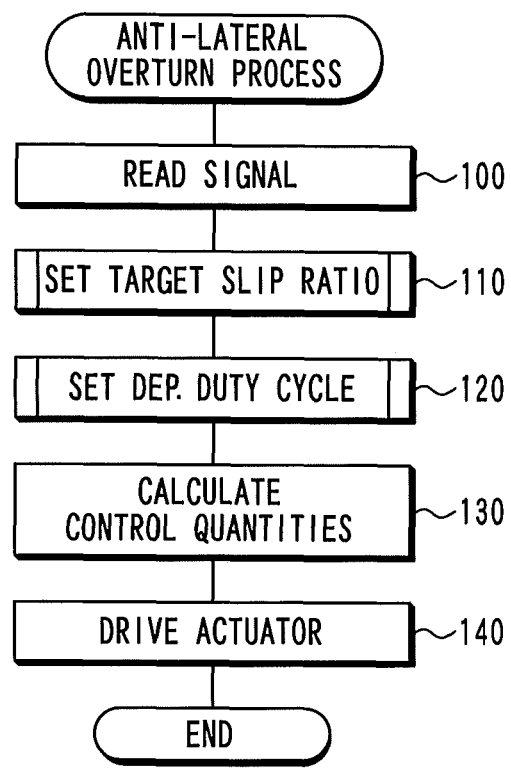
FIG. 3 is a flowchart showing an anti-lateral overturn control which a brake ECU performs in accordance with a program.

FIG. 3 is a flowchart of an anti-lateral overturn control process, which is performed by the brake ECU 70. The anti-lateral overturn control process is performed repeatedly once per a predetermined calculation period after an ignition switch (not shown in the drawings) provided in the vehicle is turned on, or otherwise, while the vehicle is running.

First, at step 100, the brake ECU 70 reads several types of sensor signals. More specifically, the brake ECU 70 reads detection signals from the wheel speed sensors 71 to 74, the lateral acceleration sensor 75, and the like which are necessary for anti-lateral overturn control and then calculates several physical quantities. With this operation, the wheel speeds of the wheels FL to RR and the lateral acceleration Gy are calculated, and the vehicle speed (the estimated speed of the body of the vehicle) is calculated by means of a well-known method. In addition, the actual slip ratios Sa of the wheels FL to RR are calculated each of which is expressed by means of deviation (i.e. (vehicle speed−wheel speed)/vehicle speed) of the vehicle speed from a wheel speed. The lateral acceleration Gy sometimes become positive and sometimes become negative depending on, for example, whether they indicate left or right. The direction (left or right) corresponding to positive values can be determined arbitrarily.

Figure 4:
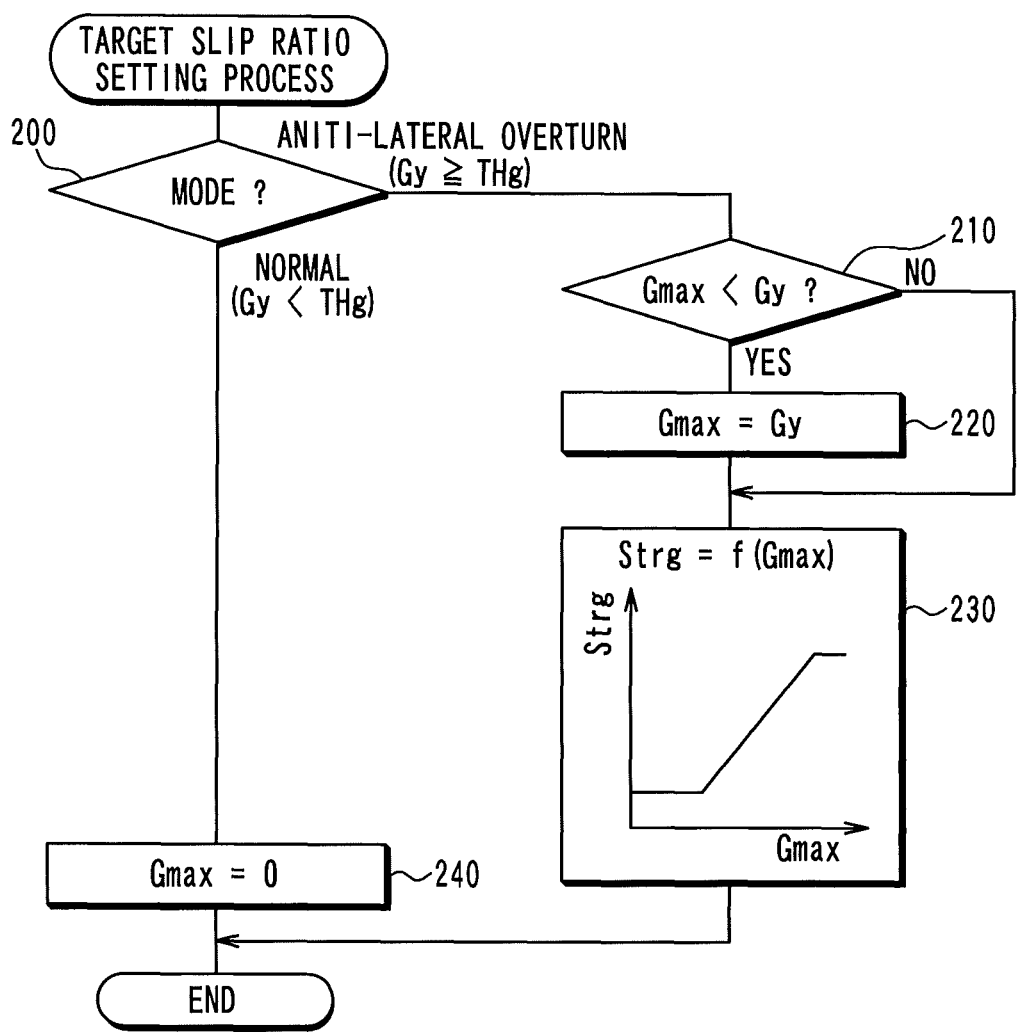
FIG. 4 is a flowchart showing details of a target slip ratio setting process.

Subsequently at step 110, the brake ECU 70 performs a target slip ratio setting process. FIG. 4 is a flowchart showing details of the target slip ratio setting process. Hereinafter, the target slip ratio setting process is described with reference to FIG. 4.

In the target slip ratio setting process, the brake ECU 70 first determines at step 200 whether to be in the anti-lateral overturn mode. More specifically, the brake ECU 70 determines whether the lateral acceleration Gy detected at step 100 is equal to or larger than a threshold THg (i.e. a motion state threshold), wherein the threshold THg is a reference value for determining whether the anti-lateral overturn control should be performed. If the determination at step 200 is affirmative, the brake ECU 70 enters or remains in the anti-lateral overturn mode and then proceeds to step 210. More specifically, the brake ECU 70 enters the anti-lateral overturn mode if it is not in the anti-lateral overturn mode, and remains in the anti-lateral overturn mode if it is already in the anti-lateral overturn mode. If the determination at step 200 is negative, the brake ECU 70 enters or remains in a normal mode and then proceeds to step 240, wherein the normal mode is a mode in which the anti-lateral overturn control is not necessary.

At step 210, the brake ECU 70 determines whether the absolute value of the lateral acceleration Gy calculated in the present calculation period is larger than a largest value Gmax, wherein the largest value Gmax is equal to the largest value of the absolute value of the lateral acceleration Gy detected during a time range between the previous calculation period and a past time instance when the brake ECU 70 enters the anti-lateral overturn mode. If the determination at step 210 is affirmative, the brake ECU 70 proceeds to step 220 to update the largest value Gmax so that the largest value Gmax becomes equal to the absolute value of the lateral acceleration Gy calculated at the present calculation period and then proceeds to step 230. If the determination at step 210 is negative, the brake ECU 70 does not update the largest value Gmax and proceed to step 230. This operation makes it possible to keep updating and memorizing the largest value Gmax as the largest value of all absolute values of the lateral acceleration Gy detected during a time range between the present calculation period and a past time instance when the brake ECU 70 enters the anti-lateral overturn mode.

At step 230, the brake ECU 70 performs a target slip ratio setting process in which a target slip ratio Strg is determined. The target slip ratio Strg is calculated as a value corresponding to the largest value Gmax. In the present embodiment, the target slip ratio Strg is obtained based on a map or a function expression Strg=f(Gmax) both of which indicate a correspondence between the largest value Gmax and the target slip ratio Strg. More specifically, the target slip ratio Strg becomes larger as the largest value Gmax becomes larger. However, a lower limit and an upper limit are defined for the target slip ratio Strg in the present embodiment. The brake ECU 70 sets the target slip ratio Strg to the lower limit when the largest value Gmax is smaller than a first predetermined value and sets the target slip ratio Strg to the upper limit when the largest value Gmax is equal to or larger than a second predetermined value which is larger than the first predetermined value.

Thus, the brake ECU 70 sets the target slip ratio Strg so that it becomes larger as the largest value Gmax becomes larger. Therefore, the brake ECU 70 actively generates slip and thereby keeps the vehicle skidding while the brake ECU 70 is in the anti-lateral overturn mode.

On the other hand, the brake ECU 70 clears the largest value Gmax for the lateral acceleration Gy to zero at step 240 and then proceeds to step 120.

Figure 5:
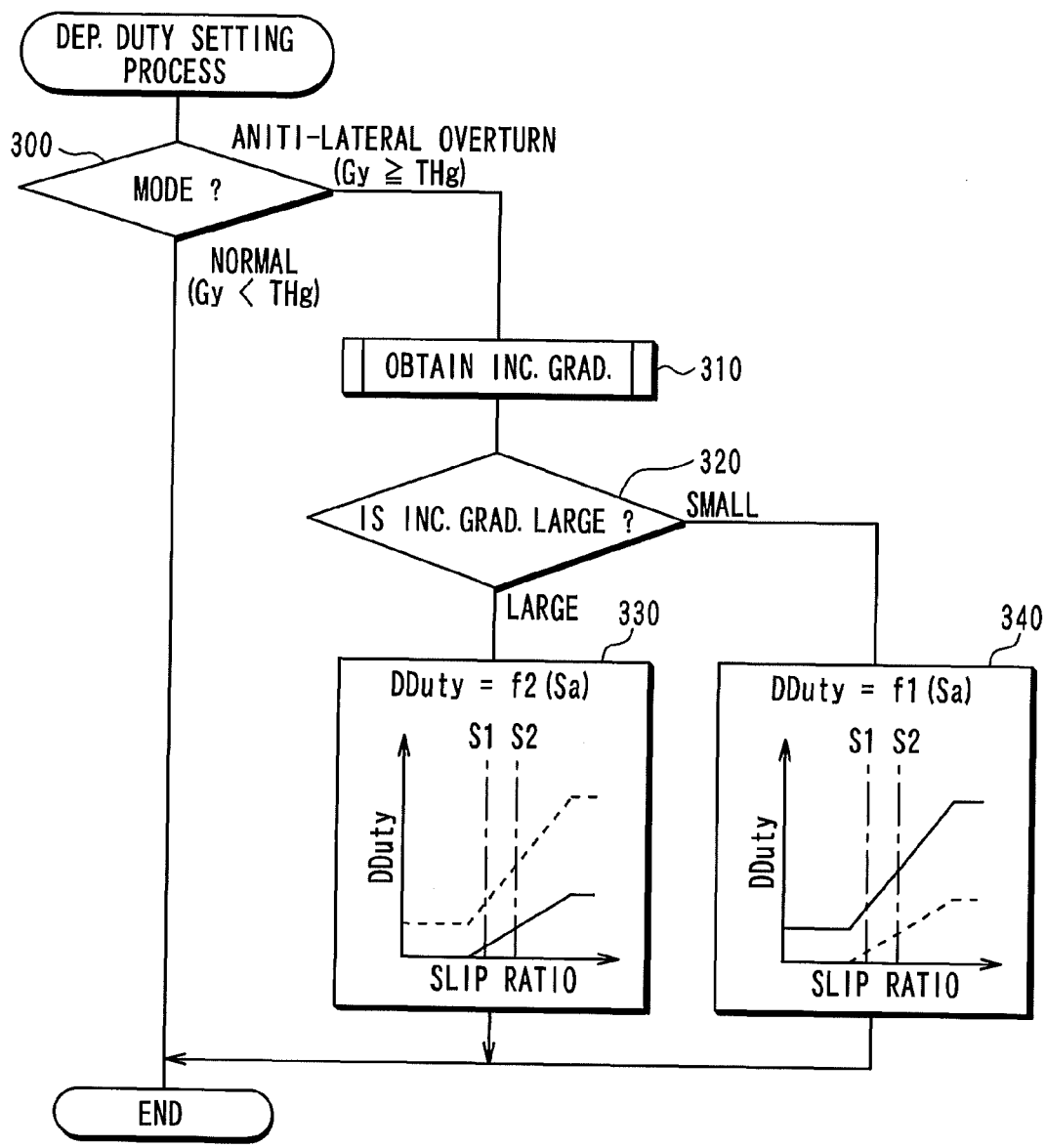
FIG. 5 is a flowchart showing details of a depressurization duty setting process.

At step 120, the brake ECU 70 performs a depressurization duty setting process. In the depressurization duty setting process, a depressurization duty cycle DDuty is set so that a speed of depressurization (depressurization gradient) is suppressed when the brake ECU 70 is in the depressurization mode for the W/C pressure. The depressurization duty cycle DDuty is defined as follows. In the depressurization mode, the pressure reducing control valve for a wheel to be controlled switches from a closed state to a communicated state in a pulse-like manner so that the W/C pressure is decreased in the communicated state. In this depressurization control mode, the depressurization duty cycle DDuty is a proportion of time during which the pressure reducing control valve for the wheel to be controlled is set to a communicated state. The speed of depressurization increases as the depressurization duty cycle DDuty becomes larger, since the larger depressurization duty cycle DDuty decreases the W/C pressure more massively. When the speed of depressurization of the W/C becomes larger in the depressurization mode, the brake force decreases more greatly and the actual slip ratio Sa further decreases. In order to prevent this from causing the lateral acceleration Gy to increase further, the brake ECU 70 suppresses the speed of the depressurization of the W/C by adjusting the depressurization duty cycle DDuty so that the depressurization duty cycle DDuty becomes smaller in the case that the lateral acceleration Gy is close to its peak value than in the case that lateral acceleration Gy is far apart from its peak value. FIG. 5 is a flowchart showing details of the depressurization duty setting process.

In the depressurization duty setting process, the brake ECU 70 determines at step 300 whether to be in the anti-lateral overturn mode. The determination is performed in the same manner as step 200 in FIG. 4. If the determination at step 300 is affirmative, the brake ECU 70 enters or remains in the anti-lateral overturn mode and proceeds to step 310. If the determination at step 300 is negative, the brake ECU 70 enters or remains in the normal mode and ends the depressurization duty setting process without executing steps 310 to 340.

Figure 6:
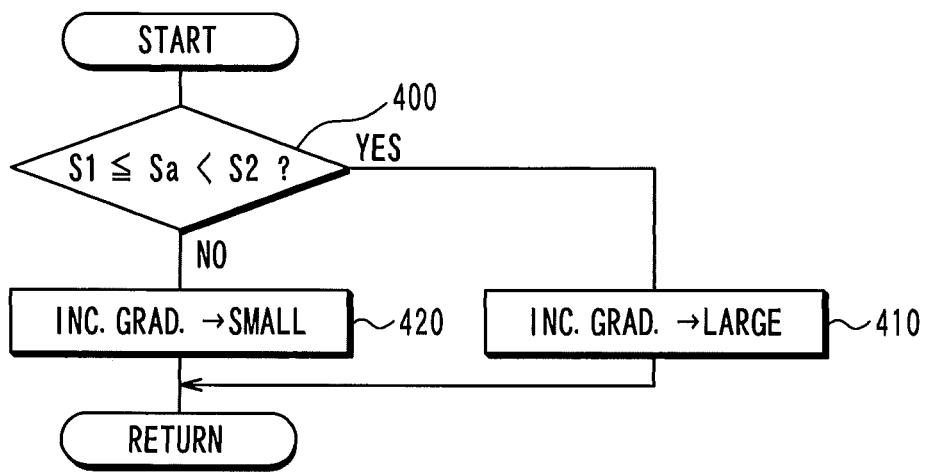
FIG. 6 is a flowchart showing details of an increase gradient obtaining process.

At step 310, the brake ECU 70 performs an increase gradient obtaining process in which an increase gradient is obtained. The increase gradient is a ratio of an increase amount of the lateral acceleration Gy to a decrease amount of the actual slip ratio Sa. FIG. 6 is a flowchart showing details of the increase gradient obtaining process.

In the increase gradient obtaining process, the brake ECU 70 determines at step 400 whether or not the actual slip ratio Sa detected at the present control period is equal to or larger than a first threshold S1 and is also smaller than a second threshold S2.

Figure 12:
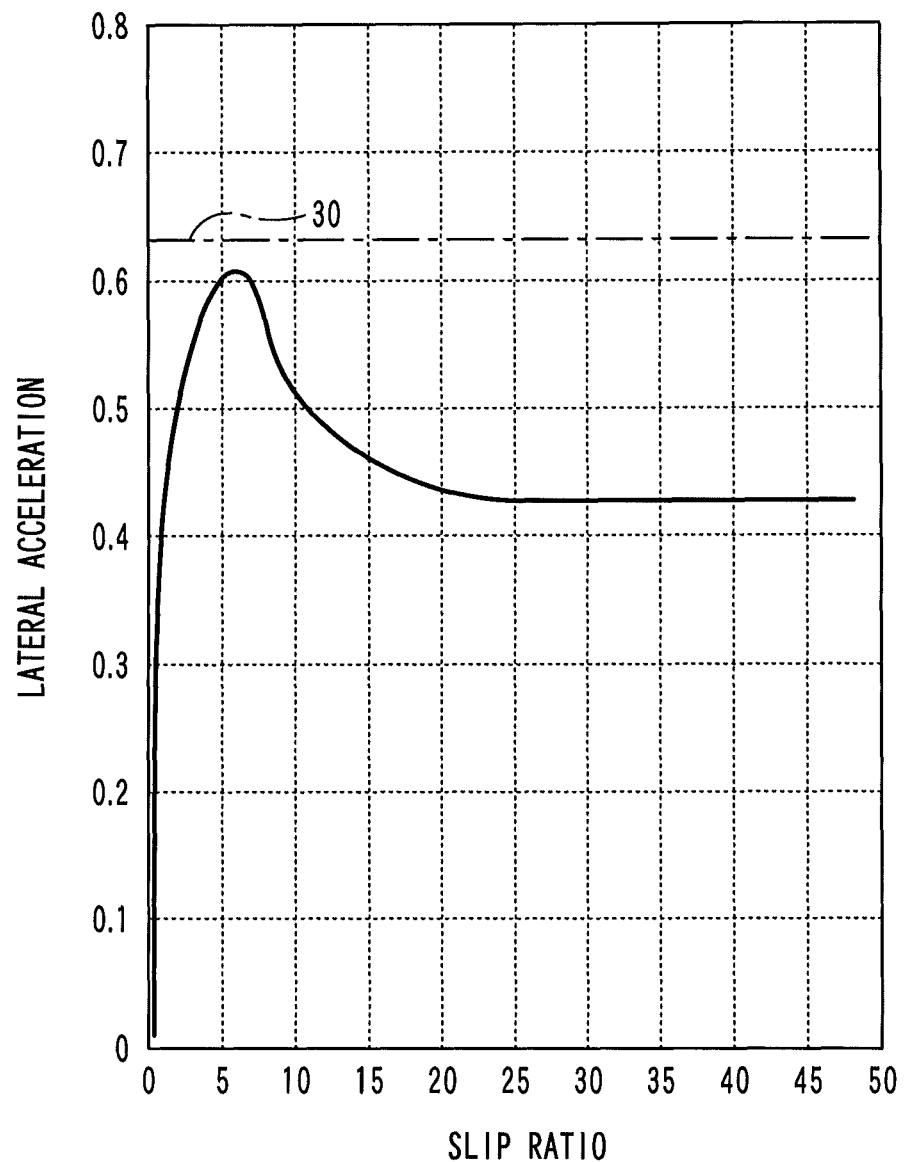
FIG. 12 is a graph showing a relation between a slip ratio and a lateral acceleration of a front outside wheel.
Figure 13:
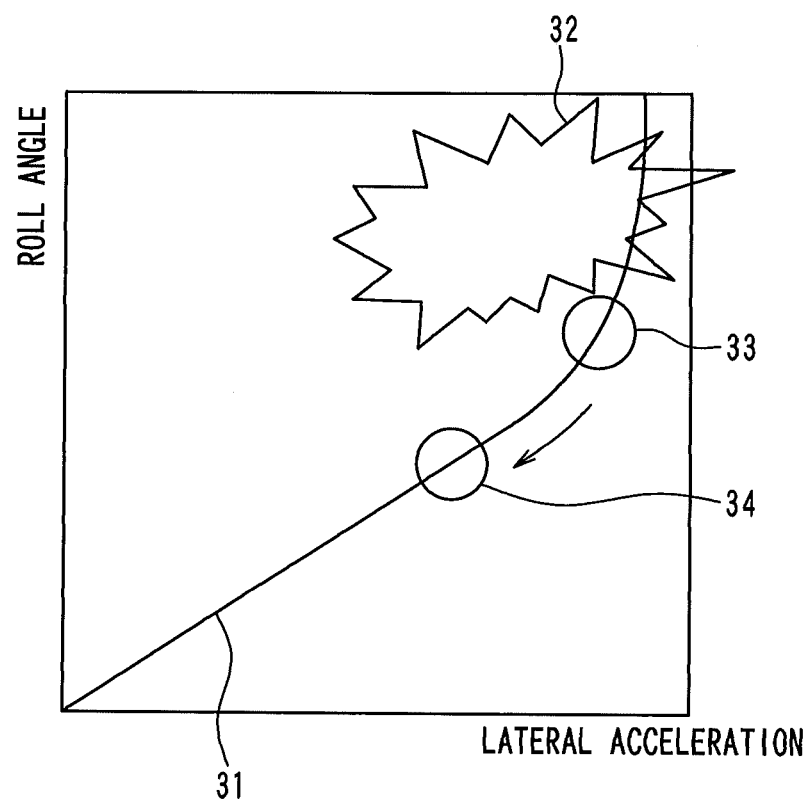
FIG. 13 is a graph showing the lateral acceleration and a roll angle.

The first threshold S1 is determined to become equal to a value of the slip ratio at which the lateral acceleration Gy which changes depending on the slip ratio reaches its peak value. For example, as is already described, the characteristic of change of the lateral acceleration Gy shown in FIG. 12 varies depending on characteristic of a tire, state of the surface of the road, and the total weight of the vehicle. Therefore, by finding the characteristic in FIG. 12 through experiments or the like, it is possible to determine a peak value of the lateral acceleration Gy as a function of the slip ratio and also determine the slip ratio at which the lateral acceleration Gy reaches its peak value. The obtained slip ratio at which the lateral acceleration Gy reaches its peak value is assigned to the first threshold S1. Although the first threshold S1 is fixed to a predetermined value here, the first threshold S1 may be a value changing depending on a quantity.

The second threshold S2 is the largest value in a range of the slip ratio within which the ratio (i.e. the increase gradient) of the increase amount of the lateral acceleration Gy to the decrease amount of the slip ratio is supposed to be larger than an increase gradient threshold. The second threshold S2 is set to a value which is larger than the first threshold S1 by a predetermined value.

Although the target slip ratio Strg is set to a large value in the target slip ratio setting process, the actual slip ratio Sa cannot exactly achieve the target slip ratio Strg and becomes smaller than the target slip ratio Strg. Therefore, at a given target slip ratio Strg, a lateral acceleration Gy which is expected from the target slip ratio Strg is smaller than the actual lateral acceleration Gy since the actual lateral acceleration Gy depends on the actual slip ratio Sa. When the actual lateral acceleration Gy is large enough, the roll angle which increases as the lateral acceleration Gy increases is likely to reach a roll limit value 30 and it is therefore necessary to restrain further decrease of the actual slip ratio Ga. In order to make this possible, it is necessary to detect that the lateral acceleration Gy is close to its peak value. Therefore, on the ground that the ratio (i.e. the increase gradient) of the increase amount of the lateral acceleration Gy to the decrease amount of the actual slip ratio Sa becomes larger when the lateral acceleration Gy gets close to its peak value than when the lateral acceleration Gy is far apart from its peak value, the second threshold S2 is set to the largest value in a range of the slip ratio within which the ratio (i.e. the increase gradient) of the increase amount of the lateral acceleration Gy to the decrease amount of the slip ratio is supposed to be larger than the increase gradient threshold. The second threshold S2 can be set by finding the characteristic in FIG. 12 through experiments or the like.

Thus, a range between the first threshold S1 and the second threshold S2 is determined to be a range which results in values of the lateral acceleration close to the peak value, and the brake ECU 70 determines whether or not the ratio (i.e. the increase gradient) of the increase amount of the lateral acceleration Gy to the decrease amount of the actual slip ratio Sa is larger or small based on whether the detected actual slip ratio Sa is within this range.

If the determination at step 400 is affirmative, the brake ECU 70 proceeds to step 410 and sets the ratio (i.e. the increase gradient) of the increase amount of the lateral acceleration Gy to the decrease amount of the actual slip ratio Sa to "large" and then ends the increase gradient obtaining process. In other words, when the actual slip ratio Sa is equal to or larger than the first threshold S1 and smaller than the second threshold S2, the ratio (i.e. the increase gradient) of the increase amount of the lateral acceleration Gy to the decrease amount of the actual slip ratio Sa becomes large (see FIG. 12) since the lateral acceleration Gy is close to its peak value. Therefore, the ratio (i.e. the increase gradient) of the increase amount of the lateral acceleration Gy to the decrease amount of the actual slip ratio Sa is set to "large".

If the determination at step 400 is negative, the brake ECU 70 proceeds to step 410 and sets the ratio (i.e. the increase gradient) of the increase amount of the lateral acceleration Gy to the decrease amount of the actual slip ratio Sa to "small" and then ends the increase gradient obtaining process. In other words, when the actual slip ratio Sa is smaller larger than the first threshold S1 or larger or equal to the second threshold S2, the ratio (i.e. the increase gradient) of the increase amount of the lateral acceleration Gy to the decrease amount of the actual slip ratio Sa becomes small (see FIG. 12.) since the lateral acceleration Gy is far apart from to its peak value. Therefore, the ratio (i.e. the increase gradient) of the increase amount of the lateral acceleration Gy to the decrease amount of the actual slip ratio Sa is set to "small".

When the increase gradient obtaining process ends, the brake ECU 70 proceeds to step 320 in FIG. 5 and determines, based on the result of the increase gradient obtaining process, whether the ratio (i.e. the increase gradient) of the increase amount of the lateral acceleration Gy to the decrease amount of the actual slip ratio Sa is "large". If the determination at step 320 becomes affirmative, the brake ECU 70 proceeds to step 330. If the determination at step 320 becomes negative, the brake ECU 70 proceeds to step 340.

At each of steps 330 and 340, the brake ECU 70 sets the depressurization duty cycle DDuty to a value based on the actual slip ratio Sa. The depressurization duty cycle DDuty is calculated as a value corresponding to the actual slip ratio Sa which is detected at the present calculation period. In addition, the depressurization duty cycle DDuty in the present embodiment is calculated based on maps or function expressions DDuty=f1(Sa), DDuty=f2(Sa) which indicates a relation between the actual slip ratio Sa and the corresponding depressurization duty cycle DDuty.

More specifically, in step 330, the depressurization duty cycle DDuty becomes larger as the actual slip ratio Sa becomes larger. With a given actual slip ratio, the depressurization duty cycle DDuty calculated at step 330 is smaller than that calculated at step 340 which is executed when the ratio (i.e. the increase gradient) of the increase amount of the lateral acceleration Gy to the decrease amount of the actual slip ratio Sa is "small".

Thus, the depressurization duty cycle DDuty becomes a smaller value when the ratio (i.e. the increase gradient) of the increase amount of the lateral acceleration Gy to the decrease amount of the actual slip ratio Sa is "large" and the lateral acceleration Gy is accordingly close to its peak value. Therefore, the speed of depressurization becomes smaller and the depressurization is accordingly suppressed in the depressurization mode in which the W/C pressure is decreased.

Also in step 340, the depressurization duty cycle DDuty becomes larger as the actual slip ratio Sa becomes larger. However, with a given actual slip ratio, the depressurization duty cycle DDuty calculated at step 340 is larger than that calculated at step 330 which is executed when the ratio (i.e. the increase gradient) of the increase amount of the lateral acceleration Gy to the decrease amount of the actual slip ratio Sa is "large".

Thus, the depressurization duty cycle DDuty becomes a normal value when the ratio (i.e. the increase gradient) of the increase amount of the lateral acceleration Gy to the decrease amount of the actual slip ratio Sa is "small" and the lateral acceleration Gy is accordingly not close to its peak value. Therefore, the W/C pressure is controlled to a value corresponding to the target slip ratio Strg without restriction of the depressurization. When the depressurization duty setting process ends, the brake ECU 70 proceeds to step 130.

At step 130, the brake ECU 70 calculates control quantities based on the lateral acceleration Gy obtained at step 100. These control quantities are control quantities which is necessary to cause a wheel to be controlled to generate brake forces and cause the actual slip ratio Sa of the vehicle to become equal to the target slip ratio Strg in order to suppress tendency to the lateral overturn of the vehicle. In other words, these control quantities may be amounts of electrical current supplied to the control valves 16 to 18, 21, 22, 36 to 38, 41, 42 and the motor 60. The amounts of electrical current may be duty cycles indicating current applying time per unit time, wherein the current applying time is a time length in which electrical current is supplied. The control quantities (or the amounts of current) are calculated based on the lateral acceleration Gy since the lateral acceleration Gy is proportional to the roll angle of the vehicle and therefore indicates tendency to the lateral overturn. For example, the control quantities (or the amounts of current) may be calculated based on a map or a function expression which are stored in advance in the brake ECU 70 and indicate a relation between the lateral acceleration Gy and each of the control quantities.

Since the brake ECU 70 can determine whether the vehicle is turning right or left based on whether the detected lateral acceleration Gy is positive or negative, the brake ECU 70 can designate the front outside wheel as the wheel to be controlled. The outside wheels are wheels at the opposite side of the direction of turning of the vehicle. In addition, the brake ECU 70 may further designate the rear outside wheel as one of the wheels to be controlled, if necessary. For example, the brake ECU 70 can determine whether to designate the front outside wheel as the solo wheel to be controlled or designate the front and rear outside wheels as the wheels to be controlled.

Subsequently, the brake ECU 70 proceeds to step 140 to perform an actuator driving process. The actuator driving process is performed in order to generate a brake force at the wheel(s) to be controlled. Therefore, in the actuator driving process, the amounts of the current to be supplied to the each of the valves 16 to 18, 21, 22, 36 to 38, 41, 42, and the motor 60 driving the pumps 19, 39 are controlled. Thus, the brake ECU 70 automatically pressurizes the W/Cs 14, 15, 34, 35 and thereby generates the brake forces. The brake ECU 70 then switches between the depressurization mode, the maintain mode, and the pressure boosting mode to adjust the W/C pressures. Therefore, the actual slip ratio Sa is controlled to the target slip ratio Strg and the lateral overturn is thereby suppressed.

When the brake ECU 70 is in the depressurization mode at this time, the depressurization duty cycle DDuty becomes a value which is set at the depressurization duty setting process. Therefore, when the ratio (i.e. the increase gradient) of the increase amount of the lateral acceleration Gy to the decrease amount of the actual slip ratio Sa is "large", the depressurization duty cycle DDuty is suppressed to a small depressurization duty cycle DDuty. As a result, the speed of depressurization becomes smaller and the depressurization is accordingly suppressed.

As is described above, the brake ECU 70 in the present embodiment suppresses the depressurization duty cycle DDuty in the depressurization mode when the ratio of the increase amount of the lateral acceleration Gy to the decrease amount of the actual slip ratio Sa is large. Therefore, the brake ECU 70 can suppress the decrease of the brake force caused by the depressurization of the W/C pressure and accordingly the decrease of the actual slip ratio Sa. As a result, the brake ECU 70 can also suppress the increase of the lateral acceleration Gy caused by the decrease of the actual slip ratio Sa and the increase of the roll angle. Thus, the brake ECU 70 can prevent the roll angle from exceeding the roll limit value 30 and thereby perform the anti-lateral overturn control effectively.

In addition, in performing the anti-lateral overturn control as an example of the vehicle motion control, the brake ECU 70 sets the target slip ratio Strg based on the maximum value Gmax of the absolute value of the lateral acceleration Gy detected within the time range in which the brake ECU 70 is in the anti-lateral overturn mode. Therefore, if the actual slip ratio becomes closer to the target slip ratio Strg and the lateral acceleration Gy accordingly decreases (see FIG. 12), the target slip ratio Strg is not updated by the decreased lateral acceleration Gy. Therefore, the actual slip ratio can be maintained at a high value. Thus, the brake ECU 70 can actively generate lateral slip and thereby keep the vehicle skidding while the brake ECU 70 is in the anti-lateral overturn mode.

Thus, it is possible to make an occasion more unlikely in which decrease of the actual slip ratio causes the lateral acceleration Gy to come closer to its peak value. Therefore, it is possible to make an occasion unlikely in which the roll angle reaches a roll limit value at which the lateral overturn of the vehicle possibly occurs. Thus, it is possible to decrease possibility that the roll angle reaches the roll limit value 30 and enhance the effect of anti-lateral overturn control.

Second Embodiment

Hereinafter, a second embodiment of the present invention is described. In the present embodiment, a method for setting the depressurization duty cycle DDuty is different from that in the first embodiment, but the other features are the same as the first embodiment. Accordingly, only the different points will be described.

In the brake control system 1 of the present embodiment, the brake ECU 70 performs the anti-lateral overturn control which is the same as that of the first embodiment except for that the depressurization duty setting process in the present embodiment sets the depressurization duty cycle DDuty based on the actual slip ratio Sa and the total weight of the vehicle. The total weight of the vehicle can be detected by detection signals from load sensors 76 in FIG. 2 which are located at the suspensions or the like of the vehicle.

Figure 7:
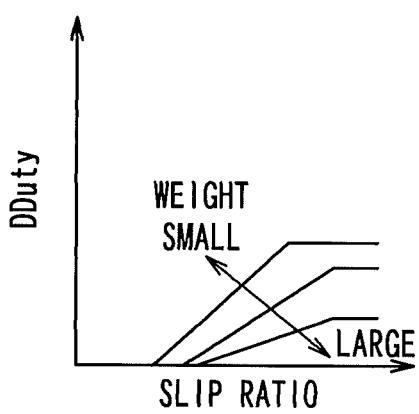
FIG. 7 is a map showing an example of a relation between an actual slip ratio Sa, a total weight of the vehicle and a depressurization duty cycle DDuty, wherein the map is used in a depressurization duty setting process according to a second embodiment of the present invention.

FIG. 7 is a map showing an example of a relation of the depressurization duty cycle DDuty to the actual slip ratio Sa and the total weight of the vehicle, which are used in the depressurization duty setting process within the anti-lateral overturn control performed by the brake ECU 70 in the present embodiment.

As shown in FIG. 7, the methods in the both embodiments for calculating the depressurization duty cycle DDuty are similar to that in the first embodiment in that depressurization duty cycle DDuty becomes larger as the actual slip ratio Sa becomes larger. However, the depressurization duty cycle DDuty becomes smaller as the total weight of the vehicle becomes larger in the method in the present embodiment. Since the peak value of the lateral acceleration shown in FIG. 12 becomes larger as the total weight of the vehicle becomes larger, the vehicle comes to have greater tendency to the lateral overturn as the total weight of the vehicle becomes larger. Therefore, the brake ECU 70 sets the depressurization duty cycle DDuty depending on the total weight, more specifically, sets the depressurization duty cycle DDuty based on a map indicating a relation in which the depressurization duty cycle DDuty becomes smaller as the total weight of the vehicle becomes larger with the actual slip ratio Sa fixed.

Thus, by changing the relation between the actual slip ratio Sa and the depressurization duty cycle DDuty based on the total weight of the vehicle, it becomes possible to set the depressurization duty cycle DDuty which is more suitable for the total weight of the vehicle. As a result, the effect of the anti-lateral overturn control becomes satisfactory even if the total weight of the vehicle is large.

Although the brake ECU 70 uses the map indicating the relation in which the depressurization duty cycle DDuty becomes smaller as the total weight of the vehicle becomes larger with the actual slip ratio Sa fixed, the brake ECU 70 may calculate the depressurization duty cycle DDuty by using a function DDuty=F3(Sa) indicating the same relation with this map.

Third Embodiment

Hereinafter, a third embodiment of the present invention is described. In the present embodiment, the increase gradient obtaining process in the depressurization duty setting process is different from that in the first embodiment, but the other features are the same as the first embodiment. Accordingly, only the different points will be described.

Figure 8:
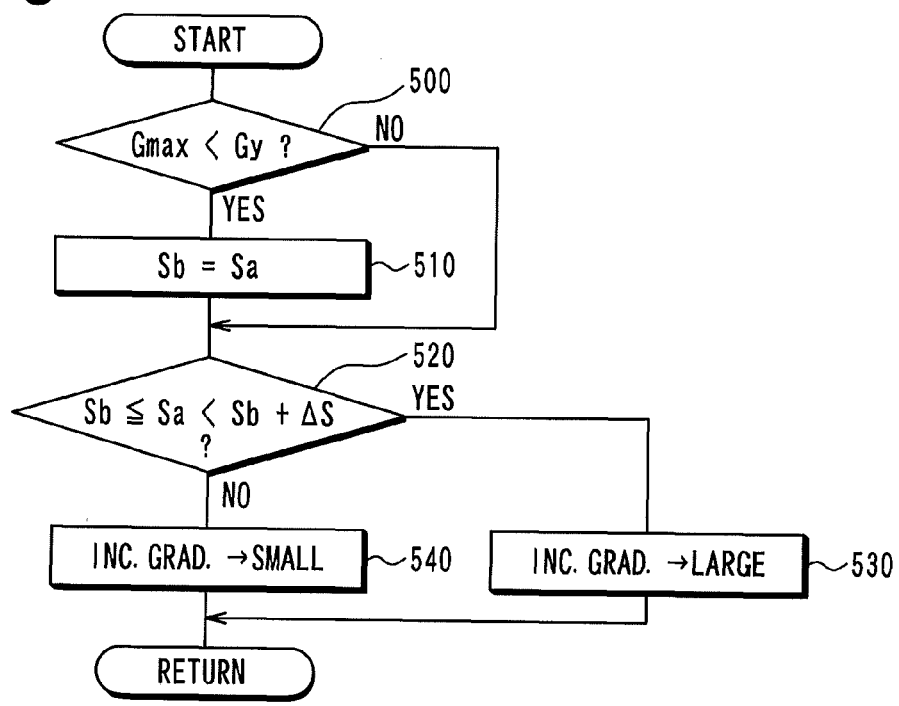
FIG. 8 is a flowchart showing an increase gradient obtaining process in a depressurization duty setting process according to a third embodiment of the present invention.

FIG. 8 is a flowchart showing the increase gradient obtaining process according to the present embodiment in the depressurization duty setting process in the anti-lateral overturn control which the brake ECU 70 performs based on a program. The increase gradient obtaining process in FIG. 8 is executed by the brake ECU 70 in place of that in FIG. 6 described in the first embodiment.

In the increase gradient obtaining process, the brake ECU 70 starts with, as shown in FIG. 8, step 500 and determines whether the absolute value of the lateral acceleration Gy detected at the present calculation period is larger than the maximum value Gmax of the absolute value of the lateral acceleration Gy detected within the time range in which the brake ECU 70 is in the anti-lateral overturn mode. In other words, the brake ECU 70 determines whether the latest lateral acceleration Gy comes closer to its peak value than any other lateral acceleration Gy detected before the present calculation period. If the determination at step 500 is affirmative, the brake ECU 70 proceeds to step 510 and updates a reference slip ratio Sb so that the reference slip ratio Sb becomes equal to the actual slip ratio Sa detected at the present calculation period. Then the brake ECU 70 proceeds to step 520. If the determination at step 500 is negative, the brake ECU 70 proceeds to step 520 without updating the reference slip ratio Sb. Thus, the brake ECU 70 can store, as the reference slip ratio Sb, the actual slip ratio Sa detected when the absolute value of the lateral acceleration Gy detected at the present control period becomes the largest value Gmax of the absolute value of the lateral acceleration Gy detected during the time range between the present calculation period and the time instance when the brake ECU 70 enters the anti-lateral overturn mode.

Subsequently, the brake ECU 70 determines at step 520 whether or not the actual slip ratio Sa detected at the present control period is equal to or larger than the reference slip ratio Sb and also smaller than the sum of the reference slip ratio Sb and an additional value ΔS. The additional value ΔS is a constant which corresponds to a difference between the second threshold S2 and the first threshold S1 in the first embodiment and indicates a range of distance from the reference slip ratio Sb, wherein the ratio (i.e. increase gradient) of the increase amount of the lateral acceleration Gy to the decrease amount of the actual slip ratio Sa is supposed to be large when the distance of the actual slip ratio Sa from the reference slip ratio Sb is within the range. The additional value ΔS can be equal to the difference (S2−S1) between the second threshold S2 and the first threshold S1. However, the additional value ΔS may be larger or smaller than the difference (S2−S1) between the second threshold S2 and the first threshold S1.

If the determination at step 520 is affirmative, the brake ECU 70 proceeds to step 530 and sets the ratio (i.e. increase gradient) of the increase amount of the lateral acceleration Gy to the decrease amount of the actual slip ratio Sa to "large" and then ends the increase gradient obtaining process. If the determination at step 520 is negative, the brake ECU 70 proceeds to step 540 and sets the ratio (i.e. increase gradient) of the increase amount of the lateral acceleration Gy to the decrease amount of the actual slip ratio Sa to "small" and then ends the increase gradient obtaining process. Thus, the brake ECU 70 performs the increase gradient obtaining process.

As is described above, the brake ECU 70 stores, as the reference slip ratio Sb, the actual slip ratio Sa detected when the absolute value of the lateral acceleration Gy detected at the present control period becomes the largest value Gmax of the absolute value of the lateral acceleration Gy detected during the time range between the present calculation period and the time instance when the brake ECU 70 enters the anti-lateral overturn mode. Then, the brake ECU 70 can determine the ratio (i.e. increase gradient) of the increase amount of the lateral acceleration Gy to the decrease amount of the actual slip ratio Sa based on whether the actual slip ratio Sa is within the range between the reference slip ratio Sb and the sum of the reference slip ratio Sb and the additional value ΔS.

With this operation, the brake ECU 70 in the present embodiment can achieve the advantageous effects described in the first embodiment and further achieve an advantageous effect as follows. The relation between the slip ratio and the lateral acceleration Gy depends on parameters such as the characteristics of the tire of the vehicle, the state of the surface of the road beneath the tire, and the total weight of the vehicle. Therefore, relation between the slip ratio and the lateral acceleration Gy changes as such parameters change. However, since the brake ECU 70 in the present embodiment determines the reference slip ratio Sb based on the parameters such as the actual slip ratio Sa which depends on the characteristics of the tire, the state of the surface of the road, and the total weight of the vehicle, the reference slip ratio Sb also depends on the parameters. Therefore, even if the parameters change, the brake ECU 70 can set the reference slip ratio Sb suitable for the parameters and thereby determine the ratio (i.e. increase gradient) of the increase amount of the lateral acceleration Gy to the decrease amount of the actual slip ratio Sa more accurately.

Fourth Embodiment

Hereinafter, a fourth embodiment of the present invention is described. In the present embodiment, the increase gradient obtaining process in the depressurization duty setting process is different from that in the first embodiment, but the other features are the same as the first embodiment. Accordingly, only the different points will be described.

Figure 9:
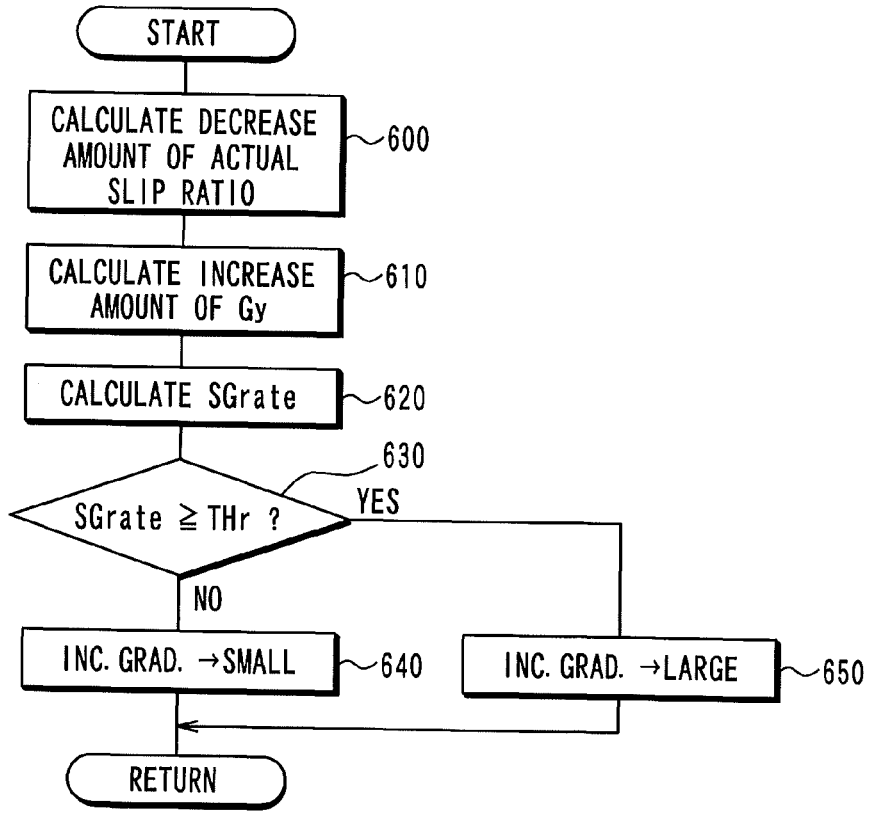
FIG. 9 is a flowchart showing an increase gradient obtaining process in a depressurization duty setting process according to a fourth embodiment of the present invention.

FIG. 9 is a flowchart showing the increase gradient obtaining process according to the present embodiment in the depressurization duty setting process in the anti-lateral overturn control which the brake ECU 70 performs based on a program. The increase gradient obtaining process in FIG. 9 is executed by the brake ECU 70 in place of that in FIG. 6 described in the first embodiment.

In the increase gradient obtaining process, the brake ECU 70 starts with, as shown in FIG. 9, step 600 to calculate a decrease amount of the actual slip ratio Sa and then proceeds to step 610 to calculate an increase amount of the lateral acceleration Gy. These processes are performed for each of the actual slip ratio Sa and the lateral acceleration Gy by calculating the difference between the value detected at the present control cycle and the value detected at the previous control cycle.

Subsequently, the brake ECU 70 proceeds to step 620 to calculate an increase gradient SGrate of the lateral acceleration Gy relative to the decrease amount of the actual slip ratio Sa. More specifically, the increase gradient SGrate is obtained by dividing the increase amount of the lateral acceleration Gy detected at step 610 by the decrease amount of the actual slip ratio Sa detected at step 600.

Subsequently, the brake ECU 70 proceeds to step 630 and determines whether a condition is satisfied that the increase gradient SGrate is equal to or larger than a predetermined value. If the determination at step 630 is affirmative, the brake ECU 70 proceeds to step 650 and sets the ratio (i.e. increase gradient) of the increase amount of the lateral acceleration Gy to the decrease amount of the actual slip ratio Sa to "large" and then ends the increase gradient obtaining process. If the determination at step 630 is negative, the brake ECU 70 proceeds to step 640 and sets the ratio (i.e. increase gradient) of the increase amount of the lateral acceleration Gy to the decrease amount of the actual slip ratio Sa to "small" and then ends the increase gradient obtaining process. Thus, the brake ECU 70 performs the increase gradient obtaining process.

As is described above, the brake ECU 70 directly obtains the increase gradient SGrate which is the ratio of the increase amount of the lateral acceleration Gy to the decrease amount of the actual slip ratio Sa and determines whether the ratio (i.e. increase gradient) of the increase amount of the lateral acceleration Gy to the decrease amount of the actual slip ratio Sa is large or small based on whether the increase gradient SGrate is larger than the threshold THr.

With this operation, the brake ECU 70 in the present embodiment can achieve the advantageous effects described in the first embodiment. In addition, since the actual slip ratio Sa which depends on the parameters such as the characteristics of the tire, the state of the surface of the road, and the total weight of the vehicle, the brake ECU 70 can set the increase gradient SGrate to a value suitable for the parameters by directly detecting the SGrate of the increase amount of the lateral acceleration Gy to the decrease amount of the actual slip ratio Sa. Therefore, even if the parameters changes, the brake ECU 70 can set the reference slip ratio Sb suitable for the parameters and thereby determine the ratio of the increase amount of the lateral acceleration Gy to the decrease amount of the actual slip ratio Sa more accurately.

Fifth Embodiment

Hereinafter, a fifth embodiment of the present invention is described. In the present embodiment, a boosting duty setting process is added to each of the first to fourth embodiments. The other features are the same as the first embodiment. Accordingly, only the different points will be described.

Figure 10:
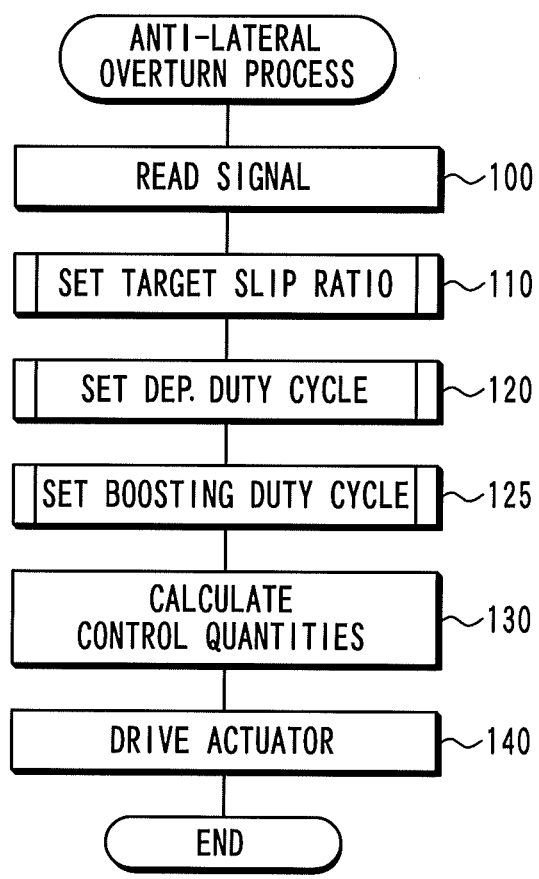
FIG. 10 is a flowchart showing an anti-lateral overturn control which the brake control system according to a fifth embodiment of the present invention performs in accordance with a program.

FIG. 10 is a flowchart showing the anti-lateral overturn control which the brake ECU 70 of the brake control system 1 for the vehicle in the present embodiment performs based on a program.

Figure 11:
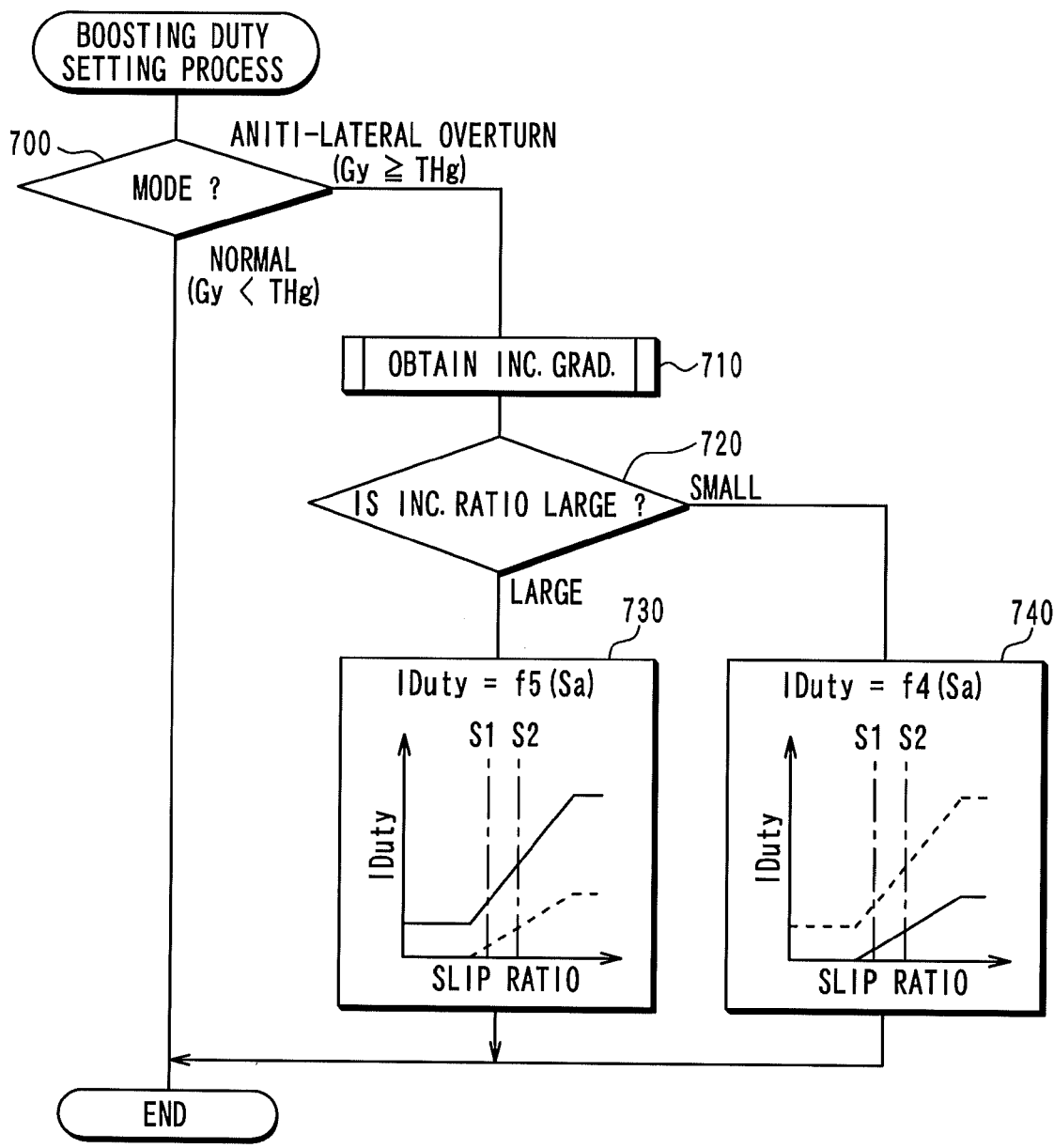
FIG. 11 is a flowchart showing details of a boosting duty setting process.

As shown in the figure, the brake ECU 70 executes the boosting duty setting process at step 125 after executing the depressurization duty setting process at step 120. In the boosting duty setting process, a boosting duty cycle IDuty is set so that a speed of pressure boosting (a gradient of pressure boosting) is adjusted when the brake ECU 70 is in the pressure boosting mode for the W/C pressure. The boosting duty cycle IDuty is defined as follows. In the pressure boosting mode, the boost control valve for a wheel to be controlled switches from a closed state to a communicated state in a pulse-like manner so that in the communicated state the W/C pressure is increased. In this pressure boosting mode, the boosting duty cycle IDuty is a proportion of time during which the boost control valve for the wheel to be controlled is set to a communicated state. The speed of pressure boosting increases as the boosting duty cycle IDuty becomes larger, since the larger boosting duty cycle IDuty increases the W/C pressure more massively. Since the brake force increases in accordance with the speed of pressure boosting of the W/C in the pressure boosting mode, the actual slip ratio Sa increases more rapidly as the speed of pressure boosting of the W/C. This causes the lateral acceleration Gy to decrease more rapidly. Therefore, the brake ECU 70 actively increases the speed of the pressure boosting of the W/C by adjusting the boosting duty cycle IDuty so that the boosting duty cycle IDuty becomes larger in the case that the lateral acceleration Gy is close to its peak value than in the case that lateral acceleration Gy is far apart from its peak value. Thus, the brake ECU 70 increases the actual slip ratio Sa more rapidly and thereby decreases the lateral acceleration Gy. FIG. 11 is a flowchart showing details of the pressure boosting duty setting process.

In the boosting duty setting process, the brake ECU 70 starts with step 700 and determines whether to be in the anti-lateral overturn mode. The process in step 700 is performed in the same manner as step 300 in FIG. 5. If the determination at step 700 is affirmative, the brake ECU 70 enters or remains in the anti-lateral overturn mode and proceeds to step 710. If the determination at step 700 is negative, the brake ECU 70 enters or remains in the normal mode and ends the boosting duty setting process.

At step 710, the brake ECU 70 performs the increase gradient obtaining process in which the increase gradient is obtained, wherein the increase gradient is the ratio of the increase amount of the lateral acceleration Gy to the decrease amount of the actual slip ratio Sa. The increase gradient obtaining process is performed in the same manner as step 310 in FIG. 5. When the increase gradient obtaining process ends, the brake ECU 70 proceeds to step 720 in FIG. 5 and determines whether the ratio of the increase amount of the lateral acceleration Gy to the decrease amount of the actual slip ratio Sa is "large". If the determination at step 720 becomes affirmative, the brake ECU 70 proceeds to step 730. If the determination at step 720 becomes negative, the brake ECU 70 proceeds to step 740.

At each of steps 730 and 740, the brake ECU 70 sets the boosting duty cycle IDuty to a value based on the actual slip ratio Sa. The boosting duty cycle IDuty is calculated as a value corresponding to the actual slip ratio Sa which is detected at the present calculation period. In addition, the boosting duty cycle IDuty in the present embodiment is calculated based on maps or function expressions IDuty=f4(Sa), IDuty=f5(Sa) which indicate a relation between the actual slip ratio Sa and the corresponding boosting duty cycle IDuty.

More specifically, in step 730, the boosting duty cycle IDuty becomes larger as the actual slip ratio Sa becomes larger. With a given actual slip ratio, the boosting duty cycle IDuty calculated at step 730 is larger than that calculated at step 740 which is executed when the ratio (i.e. the increase gradient) of the increase amount of the lateral acceleration Gy to the decrease amount of the actual slip ratio Sa is "small".

Thus, the boosting duty cycle IDuty becomes a larger value when the ratio (i.e. the increase gradient) of the increase amount of the lateral acceleration Gy to the decrease amount of the actual slip ratio Sa is "large" and the lateral acceleration Gy is accordingly close to its peak value. Therefore, the speed of pressure boosting becomes larger and the pressure boosting is accordingly performed actively in the pressure boosting mode in which the W/C pressure is increased.

Also in step 740, the boosting duty cycle IDuty becomes a larger value as the actual slip ratio Sa becomes larger. However, with a given actual slip ratio, the boosting duty cycle IDuty calculated at step 740 is smaller than that calculated at step 730 which is executed when the ratio (i.e. the increase gradient) of the increase amount of the lateral acceleration Gy to the decrease amount of the actual slip ratio Sa is "large".

Thus, the boosting duty cycle IDuty becomes a normal value when the ratio (i.e. the increase gradient) of the increase amount of the lateral acceleration Gy to the decrease amount of the actual slip ratio Sa is "small" and the lateral acceleration Gy is accordingly not close to its peak value. Therefore, the W/C pressure is controlled to a value corresponding to the target slip ratio Strg without enhancing the pressure boosting. When the depressurization duty setting process ends, the brake ECU 70 proceeds to step 130 and 140 in FIG. 10 and executes the same processes as those in the first embodiment to perform the anti-lateral overturn control.

As is described above, when the brake ECU 70 executes the boosting duty setting process in the pressure boosting mode in which the W/C pressure is increased, the brake ECU 70 increases the speed of the pressure boosting of the W/C by actively adjusting the boosting duty cycle IDuty so that the boosting duty cycle IDuty becomes larger in the case that the lateral acceleration Gy is close to its peak value than in the case that lateral acceleration Gy is far apart from its peak value. This operation makes it possible to increase further the actual slip ratio Sa and decrease more rapidly the lateral acceleration Gy. Therefore, it is possible to make an occasion more unlikely in which the lateral acceleration Gy comes closer to its peak value. Therefore, it is possible to make an occasion unlikely in which the roll angle reaches a roll limit value at which the lateral acceleration of the vehicle possibly occurs. Thus, it is possible to decrease possibility that the roll angle reaches the roll limit value 30 and enhance the effect of anti-lateral overturn control.

Other Embodiments (1) In the above embodiments, the lateral acceleration Gy is used as an example of a physical quantity representing a state of the motion of the vehicle in the direction of the lateral overturn. However, another quantity can be used as the physical quantity representing a state of the motion of the vehicle in the direction of the lateral overturn. For example, the brake ECU 70 may detect the roll angle of the vehicle directly by means of the roll angle sensor and use the detected roll angle as the physical quantity representing a state of the motion of the vehicle in the direction of the lateral overturn. In addition, the brake ECU 70 may detect a turning direction of the vehicle and a degree of a tendency for the lateral overturn of the vehicle based on the steering angle corresponding to an amount of operation which is performed by a driver to a steering handle and the actual yaw rate actually being generated at the vehicle, wherein the steering angle and the actual yaw rate can be detected by means of a steering angle sensor and a yaw rate sensor. For example, the turning direction can be determined directly from the steering angle. The degree of the tendency for the lateral overturn of the vehicle can be represented by a difference between a target yaw rate and the actual yaw rate detected by the yaw rate sensor, wherein the target yaw rate can be estimated based on the steering angle and the lateral acceleration by using a well-known method.

(2) In the second embodiment, the relation between the actual slip ratio Sa and the depressurization duty cycle DDuty varies depending on the total weight of the vehicle. A similar manner can also be applied to the third and fourth embodiments in which the increase gradient obtaining process is different from that in the first embodiment. In the fifth embodiment, the brake ECU 70 may change the relation between the actual slip ratio Sa and the boosting duty cycle IDuty based on the total weight of the vehicle. In this case, if the boosting duty cycle IDuty is set so that it becomes larger as the total weight of the vehicle becomes larger with the actual slip ratio Sa fixed, it becomes possible to actively increase the slip ratio for a heavy vehicle which has greater tendency to cause the roll angle to exceed the roll limit value.

(3) In the above embodiments, brake ECU 70 suppresses the depressurization duty cycle DDuty and additionally performs the target slip ratio setting process to set the target slip ratio Strg to a high value. However, performing the target slip ratio setting process for setting the target slip ratio Strg in the above embodiments is just an example and may be omitted. In short, the vehicle motion control device in the present invention can suppress the increase of the lateral acceleration Gy and the roll angle and therefore suppress the lateral overturn, if only the depressurization duty cycle DDuty which is set in the depressurization mode is suppressed when the ratio (i.e. the increase gradient) of the increase amount of the lateral acceleration Gy to the decrease amount of the actual slip ratio Sa is large.

(4) In the third embodiment, the brake ECU 70 sets the reference slip ratio Sb to a value and determines whether the above mentioned increase gradient is large or small based on whether the actual slip ratio Sa is within the range between the reference slip ratio Sb and the sum of the reference slip ratio Sb and the additional constant value ΔS. In addition, the brake ECU 70 sets the speed of depressurization based on the determined increase gradient. Moreover, the brake ECU 70 may vary the way of suppressing the speed of depressurization so that the speed of depressurization decreases as the difference between the actual slip ratio Sa and the reference slip ratio Sb becomes smaller. With this operation, as the actual slip ratio Sa becomes closer to the reference slip ratio Sb, the speed of depressurization is suppressed so that it becomes less likely that the lateral acceleration Gy and the roll angle increases. Therefore, it is possible to enhance the effect of the anti-lateral overturn control when the lateral overturn is more likely.

Also, in the fourth embodiment, the brake ECU 70 directly detects the increase gradient SGrate which is the ratio of the actually increased amount of the lateral acceleration Gy to the actually decreased amount of the actual slip ratio Sa. Then, the brake ECU 70 determines whether the above mentioned ratio (i.e. the increase gradient) of the increase amount of the lateral acceleration Gy to the decrease amount of the actual slip ratio Sa is large or small based on whether the detected increase gradient SGrate is larger than the threshold THr. In addition, the brake ECU 70 sets the speed of depressurization based on the determined increase gradient. Moreover, the brake ECU 70 may vary the way of suppressing the speed of depressurization so that the speed of depressurization decreases as the detected increase gradient SGrate becomes larger. With this operation, as the lateral acceleration Gy comes closer to its peak value, the speed of depressurization is suppressed so that it becomes less likely that the lateral acceleration Gy and the roll angle increase. Therefore, it is possible to enhance the effect of the anti-lateral overturn control when the lateral overturn is more likely.

(5) In the fifth embodiment, the depressurization duty process and the boosting duty setting process shown in FIG. 11 are performed individually. However, the boosting duty setting process and the depressurization duty process may be performed simultaneously. In this case, steps 300 to 320 in FIG. 5 and steps 700 to 720 in FIG. 11 can be unified. More specifically, step 730 may be executed before or after executing step 330, and step 740 may be executed before or after executing step 340.

(6) In the above embodiments, the brake control system 1 is described as an example of the present invention, wherein the brake control system 1 generates the W/C pressure by transferring the driver's operation to the brake pedal into the hydraulic pressure. However, the brake control system 1 may generate the W/C pressure electrically by driving a motor or the like in accordance with the driver's operation to the brake pedal.

(7) Each of the steps shown in the drawings corresponds to a means for executing a process in the step. For example, in FIGS. 3 to 6 and 8 to 11, step 100 corresponds to a motion state obtaining means, step 300 corresponds to a mode setting means, step 310 corresponds to an increase gradient obtaining means, step 320 corresponds to an increase gradient determination means, step 330 corresponds to a depressurization speed suppression means, steps 500, 510 correspond to a reference slip ratio setting means, and step 730 corresponds to a boosting speed enhancement means.

What is claimed is:

1. A vehicle motion control device, comprising:
   a motion state obtaining means for obtaining, once per a predetermined calculation period, a physical quantity and an actual slip ratio being actually generated at a wheel of a vehicle, the physical quantity representing a state of motion of the vehicle in a direction of lateral overturn;
   a mode setting means for being in an anti-lateral overturn mode when the physical quantity obtained by the motion state obtaining means is larger than or equal to a motion state threshold, the anti-lateral overturn mode being for suppressing the lateral overturn of the vehicle;
   an increase gradient obtaining means for directly obtaining an increase gradient which is a ratio of an increase amount of the physical quantity to a decrease amount of the actual slip ratio, by calculating the decrease amount of the actual slip ratio, calculating the increase amount of the physical quantity, and dividing the increase amount of the physical quantity by the decrease amount of the actual slip ratio;
   an increase gradient determination means for determining whether or not the increase gradient obtained by the increase gradient obtaining means is larger than or equal to a predetermined increase gradient threshold; and
   a depressurization speed suppression means for decreasing, when the vehicle motion control device is in the anti-lateral overturn mode and the increase gradient determination means determines that the increase gradient is larger than or equal to the increase gradient threshold, a speed of depressurization of a wheel cylinder pressure at a wheel cylinder for generating a brake force at the wheel, compared to when it is neither determined that the increase gradient is larger than nor equal to the increase gradient threshold, and thereby for suppressing decrease of the actual slip ratio and suppressing increase of the physical quantity and a roll angle of the vehicle which are caused by the decrease of the actual slip ratio.

2. The vehicle motion control device according to claim 1, wherein the depressurization speed suppression means changes a way of decreasing the speed of the depressurization based on a total weight of the vehicle so that the speed of the depressurization becomes smaller as the total weight of the vehicle increases.

3. The vehicle motion control device according to claim 1, wherein the depressurization speed suppression means changes the way of decreasing the speed of the depressurization so that the speed of the depressurization becomes smaller as the increase gradient directly obtained by the increase gradient obtaining means increases.

4. The vehicle motion control device according to claim 1, further comprising a boosting speed enhancement means for increasing, when the vehicle motion control device is in the anti-lateral overturn mode and the increase gradient determination means determines that the increase gradient is larger than or equal to the increase gradient threshold, a speed of pressure boosting of the wheel cylinder pressure at the wheel cylinder for generating the brake force at the wheel, compared to when it is neither determined that the increase gradient is larger than nor equal to the increase gradient threshold.

5. The vehicle motion control device according to claim 2, wherein the depressurization speed suppression means changes the way of decreasing the speed of the depressurization so that the speed of the depressurization becomes smaller as the increase gradient directly obtained by the increase gradient obtaining means increases.

6. The vehicle motion control device according to claim 2, further comprising a boosting speed enhancement means for increasing, when the vehicle motion control device is in the anti-lateral overturn mode and the increase gradient determination means determines that the increase gradient is larger than or equal to the increase gradient threshold, a speed of pressure boosting of the wheel cylinder pressure at the wheel cylinder for generating the brake force at the wheel, compared to when it is neither determined that the increase gradient is larger than nor equal to the increase gradient threshold.

* * * * *